US005271127A

United States Patent [19]
Christensen

[11] Patent Number: 5,271,127
[45] Date of Patent: Dec. 21, 1993

[54] QUICK FASTEN AND RELEASE TIE DOWN DEVICE

[76] Inventor: David Christensen, 11 Moores Mill Rd., Pennington, N.J. 08534

[21] Appl. No.: 982,379

[22] Filed: Nov. 25, 1992

[51] Int. Cl.$^5$ .................... A44B 11/00; A44B 21/00
[52] U.S. Cl. ............................ 24/16 R; 24/68 CD; 24/170
[58] Field of Search ............ 24/16 R, 68 CD, 68 CT, 24/68 E, 170, 193, 199; 280/179 R, 179 A; 410/100

[56] References Cited

U.S. PATENT DOCUMENTS

| | | | |
|---|---|---|---|
| 3,884 | 1/1845 | Beverly | 24/170 |
| 318,053 | 5/1885 | Thurlow | 24/170 |
| 747,365 | 12/1903 | Battice | 24/16 R |
| 950,434 | 2/1910 | Carlson | 24/170 |
| 2,491,290 | 12/1949 | Tinnerman | 24/16 R |
| 2,845,674 | 8/1958 | Pearson | 24/170 |
| 2,998,626 | 9/1961 | Prete, Jr. | |
| 4,174,119 | 11/1979 | Biles | |
| 4,567,628 | 2/1986 | Prete, Jr. et al. | |
| 4,881,303 | 11/1989 | Martini | 24/170 |
| 5,156,506 | 10/1992 | Bailey | 24/68 CD |

Primary Examiner—Victor N. Sakran
Attorney, Agent, or Firm—Kenneth P. Glynn

[57] ABSTRACT

The present invention is directed to a tie down device for securing a load. It includes a bracket having a top and a bottom, a front and a back, a first side and an opposite side. It also includes a strap with the top of the bracket having means to attach one end of the strap to it and the strap is at least long enough to wrap around a load and to be placed between the sides of the bracket such as the strap extends past the bottom of the bracket. There is also a cam with one side of the bracket having means to rotatably mount the cam. The cam has a serrated surface with which to make contact and grip the strap. A plate is located on the opposite side of the bracket so that when the strap is placed between the sides of the bracket, the cam contacts the strap and restraining force is applied to the opposite sides of the strap by both the plate and the cam. An additional surface on the plate serves to captivate the strap once engaged. In one preferred embodiment, an operator wheel is included with the cam to enable a quick opening of the cam for one handed insertion of the strap.

20 Claims, 4 Drawing Sheets

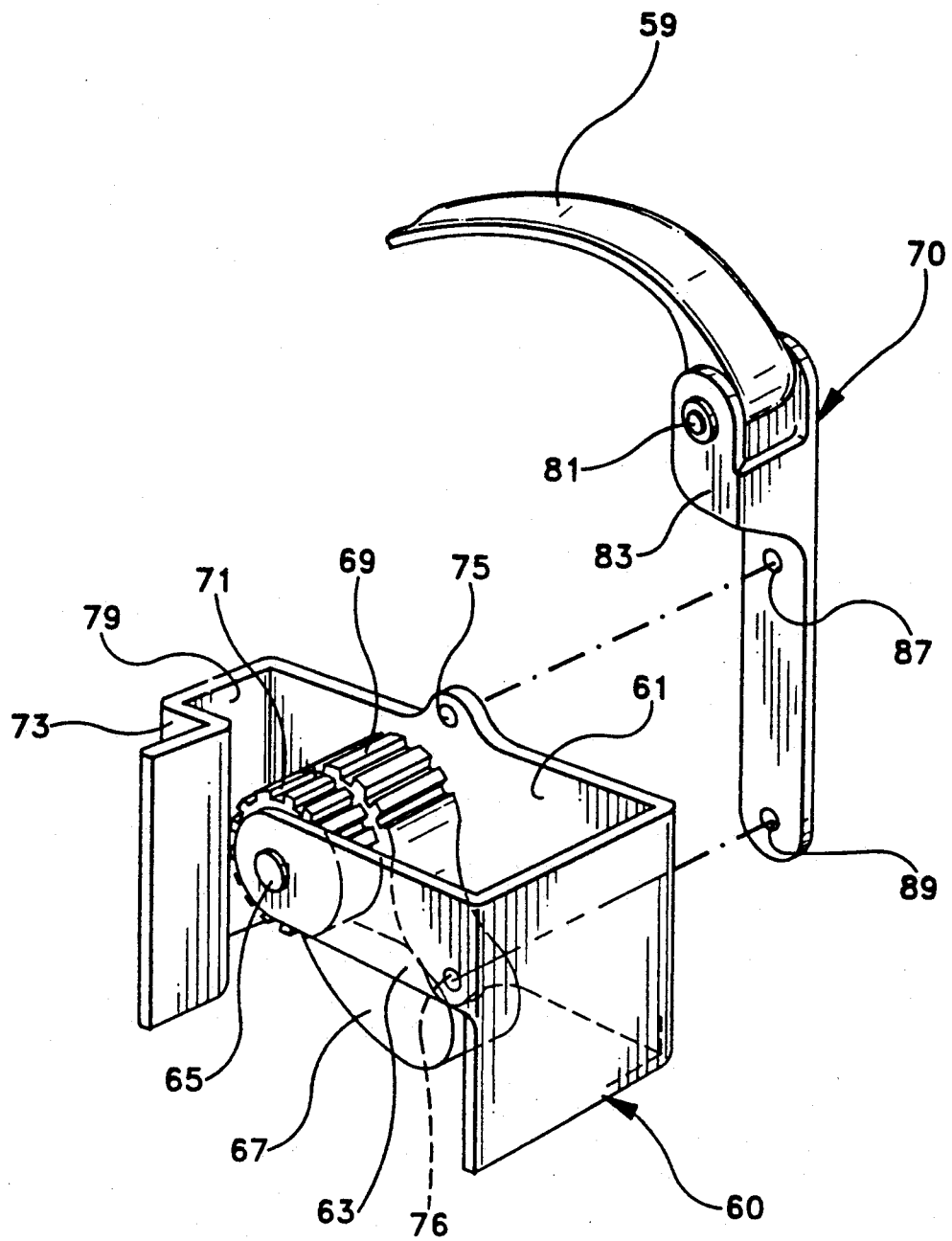

QUICK FASTEN AND RELEASE TIE DOWN DEVICE

BACKGROUND OF THE INVENTION

1. Field of the Invention

The present invention is directed toward a tie down device for holding a load in place. Specifically, the device may be mounted on the frame of a truck, such as a pick-up truck, and may be used to secure cargo such as a ladder on the top or side of the truck.

2. Prior Art Statement

For many years, tie downs have been used extensively throughout the transportation industry for countless fastening operations. Present devices range from simple rubber straps with hooks on each end to complex systems. All have various shortcomings. It is an object of the present invention to overcome these shortcomings.

A rubber strap with hooks on both ends is secured by hooking one end, wrapping around the load, stretching or over-stretching the strap, and hooking the other end. The over-stretching at installation can cause physical injury if the strap is released accidently by slippage or breakage. Removal of an over stretched strap is similarly dangerous. Also, frequent over-stretching will eventually lead to a failure of the strap.

U.S. Pat. No. 4,174,119 to Biles teaches a complex system for holding a load to a post on a pick up truck. A rope is held in place at one end by a hook, is wrapped around the load and is attached to a jacking device. The jack applies tension to the rope after the load has been wrapped or bundled. Not only does this device require a jack to apply tension, but it requires the rope to be threaded and unthreaded for use. It also requires a complex, inflexible method of operation.

U.S. Pat. No. 4,567,628 to Prete, Jr. et al. discloses a buckle assembly to tie down loads, but requires threading the strap through a complex path within the buckle so that it can not be removed and replaced quickly, and certainly cannot be used with only one hand.

U.S. Pat. No. 2,998,620 to Prete, Jr. discloses a buckle assembly which has drawbacks similar to the drawbacks of the Prete, Jr. et al. patent described above.

Numerous buckles for straps appear in the prior art. None of these disclose a device wherein the strap can easily and quickly be removed and be replaced, and can be used with a one handed operation.

SUMMARY OF THE INVENTION

The present invention is a tie down device for fastening a load. Specifically, the device may be mounted on the frame of a truck or ladder rack and used to secure a load such as a ladder on the top of the truck. The device includes a bracket to which a strap is attached. The strap is looped around the load to be tied down and placed in the bracket between a cam and a holding plate. The cam is engaged and holds the strap in place in a stretched condition. The infinite number of engagement points possible along the strap allow the engaged strap to be maintained within its safe stretch length. One important feature of the present invention is the fact that the strap does not need to be threaded; it is placed in the device through a side opening of the bracket.

In a preferred embodiment, the cam is spring loaded or has a counter-weighted arm to aid in engagement. There is an operator wheel attached to the cam which causes the cam to open when strap is engaged and pulled downward between the wheel and the opposite surface. When the cam rotates downward and the cam surface becomes flush with the wheel surface, the rubber strap is then moved inward to engage the cam surface. A spring or counter-weighted arm on the cam causes initial contact and engagement of the rubber strap between the cam and the opposite surface. Elasticity in the rubber strap causes the cam and the strap to move upward into full engagement. This allows for a quick, one-handed insertion and engagement of the strap.

This "operator" wheel may also be a ratchet wheel next to the cam which rotates freely when rotated in the same direction as the rotation of the cam. During engagement, when the ratchet wheel is reversed, it engages the cam and rotates the cam open.

There is a recessed surface opposite the cam which captivates the rubber strap when engaged prohibiting outward movement of the rubber strap and accidental disengagement with the cam.

BRIEF DESCRIPTION OF THE DRAWINGS

The present invention, its advantages and objects will be more fully understood when the specification herein is taken in conjunction with the appended drawings hereto, wherein.

DETAILED DESCRIPTION OF THE INVENTION

The present invention involves a tie down device for holding a load in place. More specifically, it can be mounted on the frame of a truck or ladder rack or wherever else a light load is needed to be held in place. Thus, it may be used to secure cargo, such as a ladder, pipes, lumber, etc., on the top of the truck. The device can be permanently mounted onto a surface or can be readily removable and reattachable. Once in place, the strap is placed around the load to be held in place, and can be easily and quickly placed in the bracket of the device and locked in place. This can be done with one hand. Thus, it is an object of the present invention to enable a user to quickly and easily secure cargo. It is another object to have a device which is easily manufactured and not complex as are many securing devices available. It is also an object of the present invention to provide a device which may be permanently attached or portable and, in its portable mode, to be useful for many varied purposes. It is also an object to provide a device that has infinite adjustability with the length of its strap to easily and safely handle various size loads without undue tightness or looseness.

Figure 1:
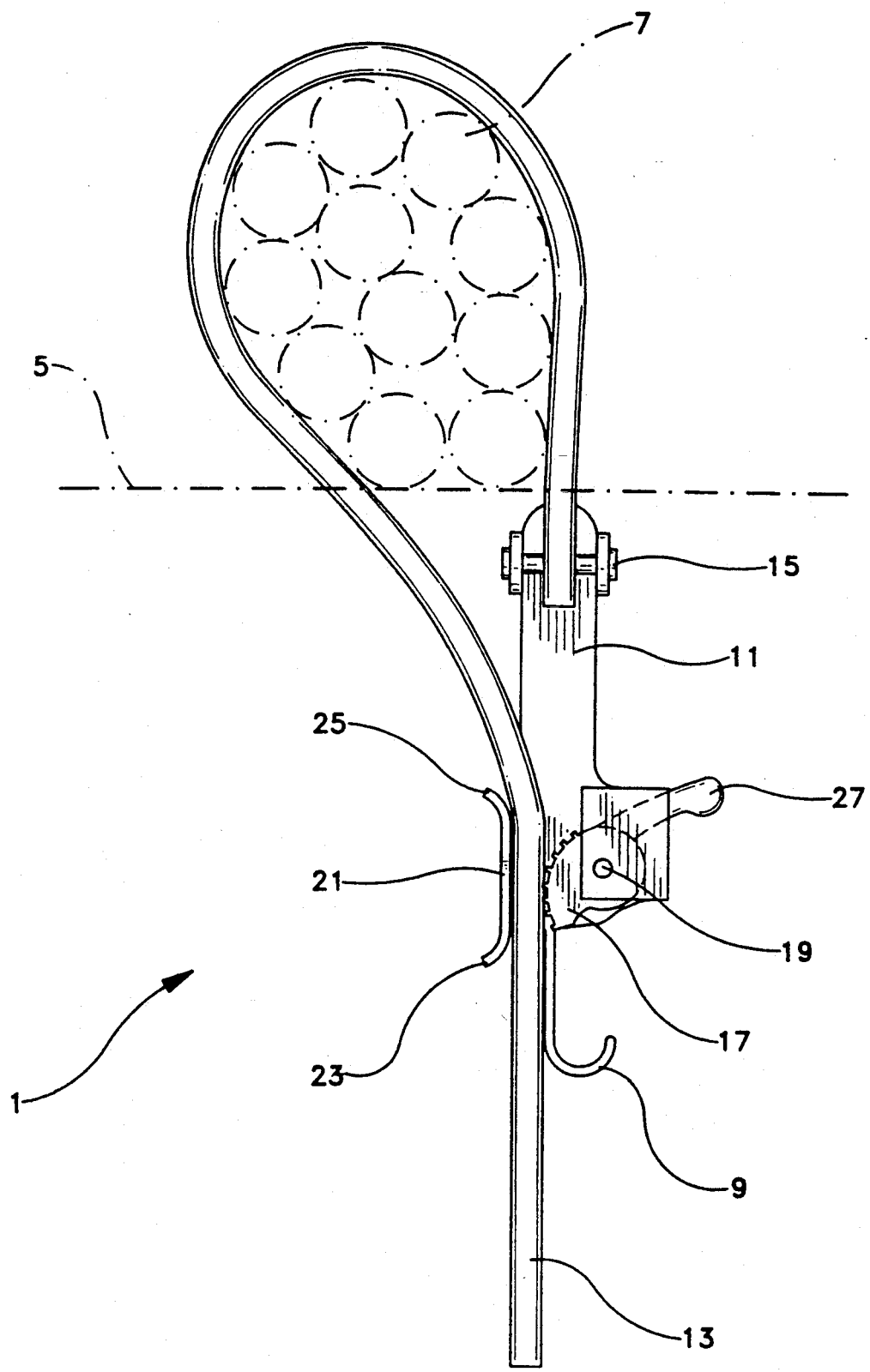
FIG. 1 illustrates a side view of one preferred embodiment with the strap placed in the bracket and with the cam engaged.

Referring now to FIG. 1, there is illustrated a side view of one of the preferred embodiments. Bracket 11 has the means to either removably or permanently attach device 1 to a surface, e.g. by hook 9, or with screws (not shown), etc. Strap 13 is attached to the top of the bracket, which is held in place by clevis pin 15. Strap 13 wraps around load 7 and is placed between the plate 21 and cam 17. Cam 17 is rotatably mounted to the bracket by pin 19 such that there is an opening 5 on the front of the bracket such that strap 13 does not need to be threaded through the device, but can merely be placed between the cam 17 and plate 21 from the front of bracket 11. Optional counter-weighted arm 27 is attached to pin 19 and weighs more than cam 17 such that, by gravity, arm 27 rotates clockwise so as to bias cam 17 toward plate 21. Arm 27 may be pushed counterclockwise so as to open cam 17 for insertion of strap 13 for subsequent engagement.

Bracket 11 has the means to be attached to a surface by means as described above, or alternatively, by slidably mounting device 1's mounting plate 21, e.g. in a channel secured by holding tabs 23 and 25. This allows the device to be removed and placed elsewhere as required, e.g. inside a moving van along a horizontal or vertical channel. Bracket 11 could alternatively be permanently mounted, as described. Mounting of the device whether removable or not, can be done such that the bracket is stationary or such that the device as a whole can pivot freely as the center of load requires. For example, pin 19 could extend such that it is used to attach the bracket, allowing free pivot of the device around the pin. This will allow for the device to adjust to the position of the load during the securing process. In general, the device of the present invention may be constructed of a single strap and the bracket may be unistructurally formed of metal. Alternatively, the device may be formed of a plurality of metal pieces (in addition to the pins) and connected by conventional means such as nut and bolt, rivet or weld, and a single strap or a series of connected straps may be used.

Figure 2:
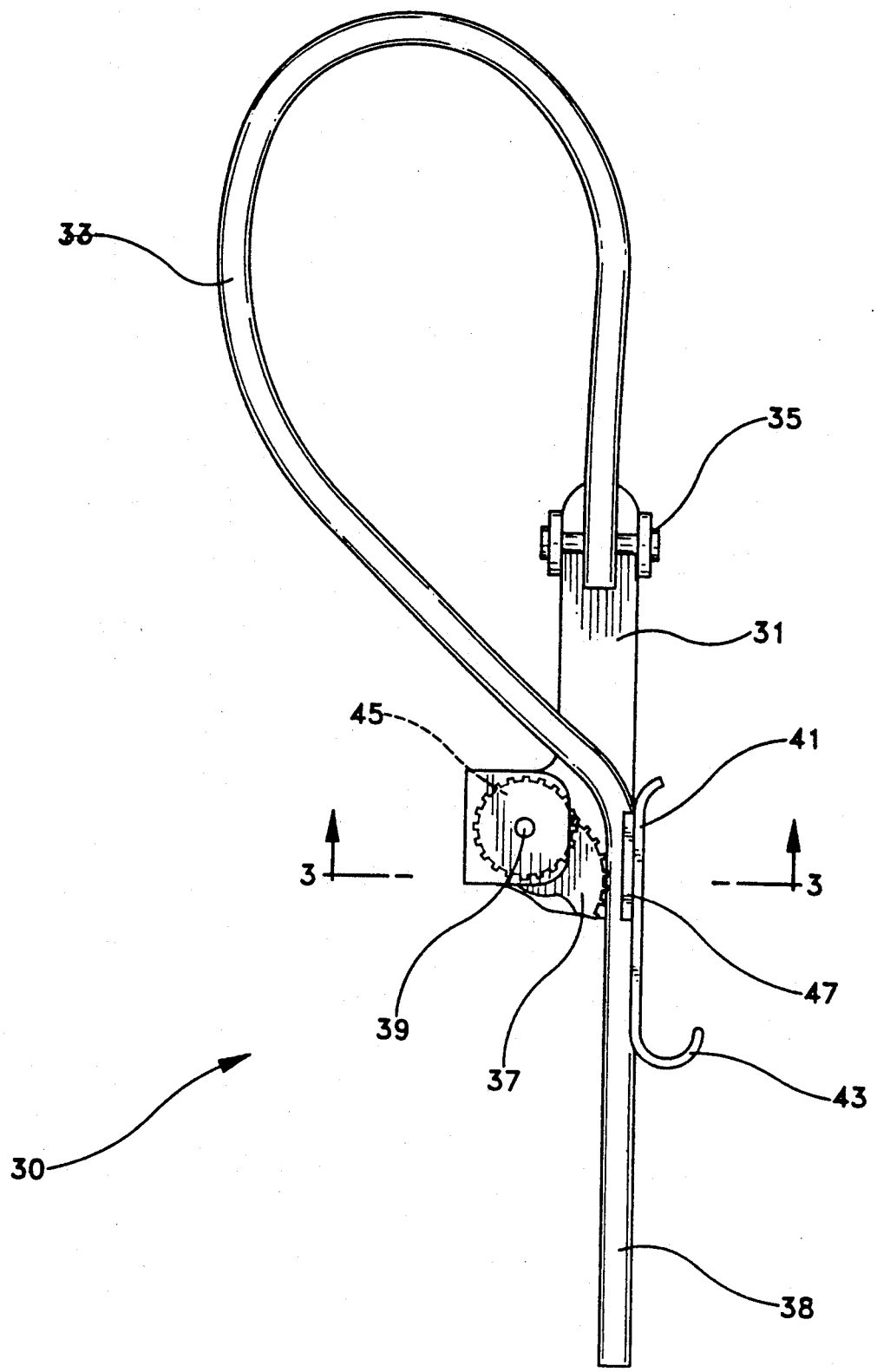
FIG. 2 illustrates a side view of another preferred embodiment of the present invention which includes a cam and an operator wheel.

FIG. 2 shows a side view of a preferred embodiment of the invention. There is a bracket 31, strap 33, pin 35, cam 37 and pin 39. However, in this embodiment there is an operator wheel 45, mounted to cam 37, on pin 39, such that the wheel aids in insertion of the strap 33 into device 30.

Ratchet wheel 45 will rotate freely when rotated in the same direction as the rotation of the cam 37 which causes cam 37 to engage. However, when ratchet wheel 45 is rotated in the opposite direction, it will engage with cam 37 and cause it to rotate such that the space between plate 41 and cam 37 increases, allowing insertion of the strap 33. An operator wheel, which could be substituted for a ratchet wheel, would be attached fast to the cam and cause the same movement of the cam when rotated. In usage, this allows for one handed operation of device. The user would place the strap next to cam 37 and between plate 41 and ratchet or operator wheel 45. By pressing strap 33 against wheel 45 and pulling strap 33 tight causing wheel 45 and cam 37 to rotate, cam 37 will open. When cam surface becomes flush with wheel surface, strap may be slid over into engagement position. Upon release, the spring action or counter-weighted action of the cam 37 will cause strap 33 to be engaged between cam 37 and plate 41. The elasticity of the strap will pull the cam up tight holding the strap fast.

To remove strap 33, the user would pull strap 33 downward and outward, thereby rotating cam 37 and disengaging the strap.

Figure 3:
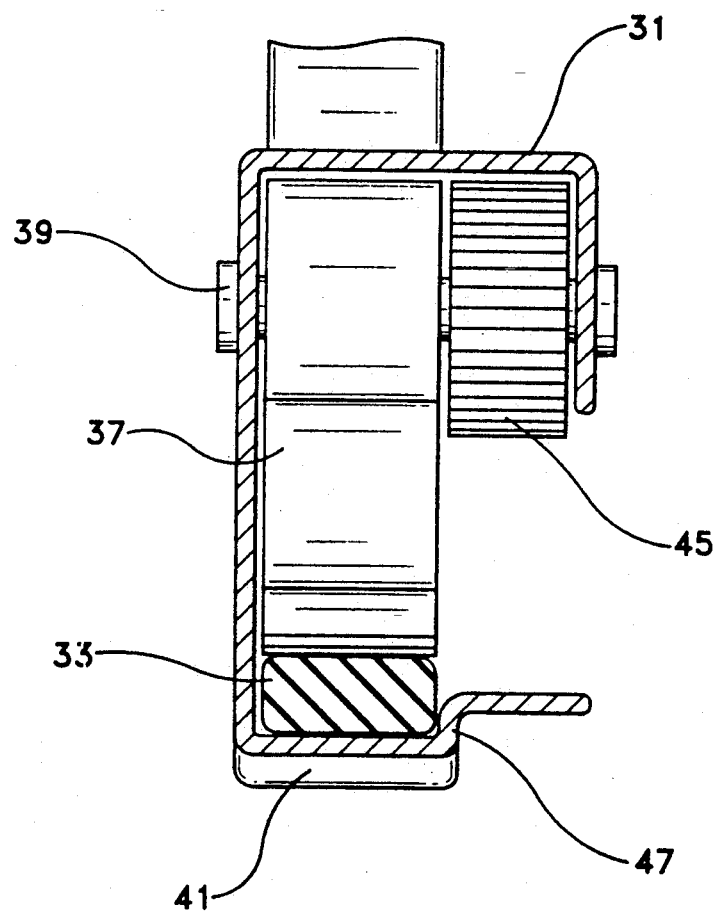
FIG. 3 illustrates a sectional view of the device of FIG. 2, showing the cam holding the strap in place; and, FIG. 4 shows an alternative embodiment front view of a present invention device which is formed in two pieces so that they may be assembled together or may be remotely spaced apart and attached to a vehicle, trailer or otherwise.

FIG. 3 shows a bottom section of the device in FIG. 3 showing more clearly how bracket 31 can partially wrap around strap 33 when engaged such that strap 33 will remain in place when engaged with cam 37. FIG. 3 also shows operator wheel 45 in relation to Cam 37. Plate 41 has an optional bent portion or wall 47, as shown, which serves to captivate strap 33 when engaged with cam 37.

FIG. 4 shows a front view of an alternative present invention device having two components, strap holder 70 and operator wheel holder 60. Bracket 61 includes a tab extension 63 to support pin 65 so as to rotatably mount operator wheel 71 and cam 67 having ratchets 69 thereon. Side wall 79 includes extension 73 and this operates much like device 30 shown with respect to FIGS. 1 and 2 shown above except that the portion of the bracket which holds the strap is separate.

Thus, strap holder 70 is formed by bracket 85 with extension 83 and this holds pin 81 to secure one end of strap 59 in a rotatable fashion. The opposite end of strap 59 (not shown) is pulled through cam 67 in the same fashion as is discussed with respect to device 30 in FIGS. 2 and 3 above. However, mounting holes 87 and 89 on bracket 85 may be used to connect it directly to bracket 61 via holes 75 and 76 so as to form essentially a single unit device which would be equivalent to that shown in FIGS. 2 and 3. However, alternatively, it should be noted that bracket 61 may be mounted at one location and bracket 85 may be mounted at a second, remote location. Thus, for example, they may be mounted at separate locations on the inside of a wall of a moving van. Alternatively, they may be removable mounted along tracks or with selected screws or nuts and bolts so as to be adjustable in the sense of not only where they may be located but how for apart they may be located from one another.

It should be noted that strap 59 should have the same characteristics as the straps described above herein and may be of any reasonable length. Thus, bracket 61 could be permanently mounted to the side of a truck, ladder support or otherwise and bracket 85 may be permanently or removably mounted to the pick-up truck, ladder support or otherwise. Thus, this particular embodiment of the present invention now allows the strap to go over the top or under the bottom or along the side of something to be secured whereas other surfaces would be used to secure opposite portions of the item or items being secured. In other words, the strap need not wrap completely around the item or items to be secured but merely over, under, or across them to achieve the desired result.

Obviously, numerous modifications and variations of the present invention are possible in light of the above teachings. It is, therefore, understood that within the scope of the appended claims, the invention may be practiced otherwise than as specifically described herein.

What is claimed is:
1. A tie down device for securing a load, comprising:
 (a) a bracket having a top and a bottom, a front and a back, a first side and an opposite side;
 (b) a strap, with said top of said bracket having means to attach one end of said strap, said strap being at least long enough so as to loop around a load and be placed between said sides of said bracket such that said strap extends past said bottom of said bracket, said strap comprises an elastic material such that tension can be placed on a load;

(c) a cam, with said one side of said bracket having means to rotatably mount said cam, said cam having a serrated surface with which to make contact and grip said strap when strap is placed between said sides of bracket and said cam is engaged;

(d) said plate located on said opposite side of said bracket such that when said strap is placed between said sides of said bracket, and said cam contacts said strap, restraining force is applied to the opposite sides of the strap by both the plate and the cam; and wherein said means to mount said cam and said plate leave an unobstructed opening in the front of the bracket between said opposite sides of said bracket such that said strap can be placed between cam and plate from the front of said bracket.

2. The device of claim 1 wherein said cam is spring loaded such that said cam engages with spring tension toward said plate.

3. The device of claim 1 wherein said device further includes a counter-weighted arm such that said cam engages toward said plate as a result of said arm.

4. The device of claim 1 wherein said device further includes an operator wheel mounted adjacent to said cam, and said bracket has the means to rotatably mount said operator wheel can such that wheel rotation causes an increase in space between the cam and said plate.

5. The device of claim 4 wherein said operator wheel is a ratcheted wheel.

6. The device of claim 1 wherein said plate of said bracket partially wraps around said strap when said strap is placed between said plate and said cam as to prevent said strap from being pulled sideways through said unobstructed opening and to protect said cam from being fouled.

7. The device of claim 1 wherein bracket is the form of two separate pieces, one piece including the top of said bracket with said strap and the other piece having said cam rotatably mounted thereon.

8. A tie down device for securing a load, comprising:
(a) a bracket having a top and a bottom, a front and a back, a first side and an opposite side;
(b) a strap, with said top of said bracket having means to attach one end of said strap, said strap being at least long enough so as to loop around a load and be placed between said sides of said bracket such that said strap extends past said bottom of said bracket;
(c) a cam, with said one side of said bracket having means to rotatably mount said cam, said cam having a serrated surface with which to make contact and grip said strap when strap is placed between said sides of bracket and said cam is engaged;
(d) said plate located on said opposite side of said bracket such that when said strap is placed between said sides of said bracket, and said cam contacts said strap, restraining force is applied to the opposite sides of the strap by both the plate and the cam; and
(e) an operator wheel mounted adjacent to said cam, and said bracket has the means to rotatably mount said operator wheel, said operator wheel being freely rotatable when rotated in the same direction as the direction of engagement of the cam, said operator and wheel being rotated in the opposite direction, so as to engage said cam such that said cam is rotated so as to increase the space between said cam and said plate wherein said means to mount said cam and said plate leave an unobstructed opening in the front of the bracket between said opposite sides of said bracket such that said strap can be placed between cam and plate from the front of said bracket.

9. The device of claim 8 wherein said cam is spring loaded such that said cam engages with spring tension toward said plate.

10. The device of claim 8 wherein said device further includes a counter-weighted arm such that said cam engages toward said plate as a result of said arm.

11. The device of claim 8 wherein said operator wheel is a ratcheted wheel.

12. The device of claim 8 wherein said plate of said bracket partially wraps around said strap when said strap is placed between said plate and said cam as to prevent said strap from being pulled sideways through said unobstructed opening and to protect said cam from being fouled.

13. The device of claim 8 wherein bracket is the form of two separate pieces, one piece including the top of said bracket with said strap and the other piece having said cam rotatably mounted thereon.

14. The device of claim 8 wherein said strap is an elastic material such that tension can be placed on a load.

15. A tie down device for securing a load, comprising:
(a) a bracket having a top and a bottom, a front and a back, a first side and an opposite side;
(b) a strap, with said top of said bracket having means to attach one end of said strap, said strap being at least long enough so as to loop around a load and be placed between said sides of said bracket such that said strap extends past said bottom of said bracket;
(c) a cam, with said one side of said bracket having means to rotatably mount said cam, said cam having a serrated surface with which to make contact and grip said strap when strap is placed between said sides of bracket and said cam is engaged, said cam being spring loaded such that said cam engages with spring tension toward said plate;
(d) said plate located on said opposite side of said bracket such that when said strap is placed between said sides of said bracket, and said cam contacts said strap, restraining force is applied to the opposite sides of the strap by both the plate and the cam; and
(e) an operator wheel mounted adjacent to said cam, and said bracket has the means to rotatably mount said operator wheel, said operator wheel being freely rotatable when rotated in the same direction as the direction of engagement of the cam, said operator and wheel being rotated in the opposite direction, so as to engage said cam such that said cam is rotated so as to increase the space between said cam and said plate wherein said means to mount said cam and said plate leave an unobstructed opening in the front of the bracket between said opposite sides of said bracket such that said strap can be placed between cam and plate from the front of said bracket.

16. The device of claim 15 wherein said device further includes a counter-weighted arm such that said cam engages toward said plate as a result of said arm.

17. The device of claim 15 wherein said operator wheel is a ratcheted wheel.

18. The device of claim 15 wherein said plate of said bracket partially wraps around said strap when said strap is placed between said plate and said cam as to prevent said strap from being pulled sideways through said unobstructed opening and to protect said cam from being fouled.

19. The device of claim 15 wherein bracket is the form of two separate pieces, one piece including the top of said bracket with said strap and the other piece having said cam rotatably mounted thereon.

20. The device of claim 15 wherein said strap is an elastic material such that tension can be placed on a load.

* * * * *